Patented Nov. 26, 1940

2,223,197

UNITED STATES PATENT OFFICE 2,223,197

TREATMENT OF HYDROCARBON GASES

Charles Wirth, III, Chicago, Ill., assignor to Universal Oil Products Company, Chicago, Ill., a corporation of Delaware No Drawing. Application August 31, 1938,
Serial No. 227,851

5 Claims. (Cl. 260—677)

This invention relates particularly to the treatment of hydrocarbon gas mixtures containing both paraffins and olefins such as those produced as by-products in the cracking of heavier fractions of petroleum to form principally gasoline boiling range distillates.

The invention is more specifically concerned with a process whereby the olefinic content of such gas mixtures may be selectively removed to concentrate the more reactive unsaturated constituents. Such a segregation is frequently necessary when the olefins are to be used in processes for the manufacture of individual compounds therefrom such as in the manufacture of alcohols by the hydrolysis of ethylene and particularly when attempts are being made to utilize the olefinic constituents of cracked gases by polymerizing them either by strictly thermal or thermal-catalytic processes to produce liquid olefinic polymers which are utilizable as high antiknock blending materials for improving the knock rating of gasolines inferior in this respect. In general the boiling ranges of the lower boiling and normally gaseous olefins are close to those of the corresponding paraffins so that separation of the olefins and paraffins by fractional distillation methods is not practical on account of the excessive tower capacities needed.

In one specific embodiment the present invention comprises a process for the selective absorption of olefins from gas mixtures which comprises contacting said gas mixtures with beta-tri-chloro-ethane.

The compound which I have found to be a selective solvent for the olefins in hydrocarbon gas mixtures is 1,1,2-tri-chloro-ethane which has the general formula, $Cl_2CH.CH_2Cl$. It boils at 113° C. and is made by chlorinating ethylene chloride. It is entirely stable, and non-corrosive to ordinary materials of construction, and may be used repeatedly without deterioration.

In the operation of the process, gas mixtures containing olefins may be admitted to the lower portion of vertical cylindrical treating towers containing filling or regularly spaced baffling material to pass upwardly countercurrent to descending streams of solvent which becomes saturated with olefins during its downward passage while the insoluble saturated compounds leave the top of the tower and are passed to any service or use desired. The absorption liquid leaving the bottom of the tower may then be passed through another auxiliary still or fractionating column wherein it is mildly heated to drive off the dissolved olefinic gases after which the solvent is cooled and returned to the top of the primary column. The process is not limited to the use of any particular apparatus and the obvious expedient of using counterflow absorption in the series of columns or any other method may be employed.

The following example is given to show the extremely selective action of the present selective solvent in segregating olefins from gas mixtures although it is not intended to limit the scope of the invention in exact agreement with the data presented.

A gas having the olefin composition shown in column 1 of the table following was passed upwardly countercurrently in a filled tower against descending streams of beta-tri-chloro-ethane at ordinary temperatures and pressures, and the second column of the table shows the composition of the gas evolved from the solvent, which extracted 42.4% of the total gas.

*Composition of gases*

| Constituent | Gas charged | Gas absorbed |
|---|---|---|
| Butylenes, percent | 0.9 | 1.6 |
| Propylene, percent | 15.6 | 31.9 |
| Ethylene, percent | 6.1 | 5.6 |

The above example shows a markedly selective action on the butylene and propylene content of the gas mixture although the ethylene was not as readily absorbed as the three and four carbon atom olefins.

I claim as my invention:

1. A process for the recovery of olefins from hydrocarbon gas mixtures which comprises subjecting said mixture to contact with beta-tri-chloro-ethane and separating the olefins from the solvent.

2. A process for the recovery of olefins from gas mixtures comprising principally three and four carbon atom hydrocarbons which comprises subjecting said mixture to contact with beta-tri-chloro-ethane and separating the olefins from the solvent.

3. A process for the recovery of olefins contained in hydrocarbon gas mixtures which comprises subjecting said mixture to contact with beta-tri-chloro-ethane at substantially atmospheric temperature and pressure, heating the solvent containing the extracted olefins to release the dissolved olefins therefrom, cooling and returning the solvent to further contact with said gas mixture.

4. A process for the recovery of olefins contained in hydrocarbon gas mixtures comprising principally three and four carbon atom hydrocarbons which comprises subjecting said mixture to contact with beta-tri-chloro-ethane at substantially atmospheric temperature and pressure, heating the solvent containing the extracted olefins to release the dissolved olefins therefrom, cooling and returning the solvent to further contact with said gas mixture.

5. A process for the recovery of butenes from hydrocarbon gas mixtures comprising principally butanes and butenes which comprises subjecting said mixture to contact with beta-tri-chloro-ethane to dissolve a substantial portion of said butenes, separating the solution of butenes, heating said solution to vaporize the dissolved butenes, cooling and returning the solvent to further contact with said hydrocarbon gas mixture.

CHARLES WIRTH, III.